United States Patent [19]

Nakata

[11] Patent Number: 4,829,697
[45] Date of Patent: May 16, 1989

[54] FISHING GEAR

[76] Inventor: Nori N. Nakata, 6 Van Allan Road, Scarborough, Toronto, Canada, M1G 1C2

[21] Appl. No.: 440,494

[22] Filed: Nov. 2, 1982

[51] Int. Cl.[4] .............................................. A01K 85/00
[52] U.S. Cl. .......................................... 43/17; 43/17.1
[58] Field of Search .................................... 43/17, 17.1

[56] References Cited

U.S. PATENT DOCUMENTS

| | | | |
|---|---|---|---|
| 1,212,388 | 1/1917 | Ojerholm | 43/17 |
| 1,808,736 | 6/1931 | Hernke | 43/17 |
| 2,684,550 | 7/1954 | Reid | 43/54.1 |
| 2,893,156 | 7/1959 | Warren | 43/17 |
| 3,190,026 | 6/1965 | Roszak | 43/17 |
| 3,729,849 | 5/1973 | Richard | 43/17 |
| 4,016,670 | 4/1977 | Pihlaja et al. | 43/17 |
| 4,030,223 | 6/1977 | Loesch et al. | 43/17 |

Primary Examiner—Kurt Rowan

[57] ABSTRACT

Fishing equipment has a tiltable arm on a standard. A supply of line is led through a guide means below and a small amount inwardly of the outer end of the tiltable arm when the latter is in an horizontal attitude. From the guide means the line is led upwardly and over a retaining means on the end of the tiltable arm. From the retaining means the line hangs into the water. The tiltable arm tilts under the pull of a fish on the line. The retaining means is designed so that such tilt of the arm releases the line from the arm when it swings inwardly of the guide means.

3 Claims, 3 Drawing Sheets

FISHING GEAR

The invention relates to ice fishing gear.

The closest prior developments known to applicant are the U.S. Pat. Nos. to:

3,729,849, Richard, May 1, 1973;
3,568,352, Hill, Mar. 9, 1971;
3,060,616, Woodley, Oct. 30, 1962;
3,190,026, Roszak, June 22, 1965;
3,187,456, Apitz, June 8, 1965;
3,163,954, Westin, Jan. 5, 1965;
3,120,072, Rybarski, Feb. 4, 1964;
3,727,342, Lindsay, Apr. 17, 1973;
4,016,670, Pihlaja, Apr. 12, 1977;
2,732,649, Tuttle, Jan. 31, 1956;
4,083,139, Schwend, Apr. 11, 1978;

The invention here provided is believed to be, in comparison to ice fishing gear in the prior art listed, more convenient, simpler and less subject to malfunction. It may be constructed of wood, plastic or other material. In its principal mode of operation it is designed to suspend a fishing line over an ice fishing hole by a linkage utilizing the weight of the line and anything pendant therefrom to balance a movable arm, preferably in a horizontal attitude. Tension applied to the line from a fish pulling thereon releases the line from the movable arm. The line is then in direct connection between its mount (preferably a fishing reel) a guide means and the fish. The standard is weighted to assume a different position (preferably upwardly standing) on release of the line to indicate that there is a fish thereon. The device embodying the described operation mode is, in applicant's development, designed so that it may be easily adapted from the above described mode of operation, for use as a hand held line or as a bobber line.

In its preferred form, the invention comprises a standard designed to extend upwardly and downwardly. A longitudinally extending movable arm is mounted on the standard to swing, on an approximately horizontal axis, from an upwardly extending attitude to an attitude where one end is downwardly sloping. The swingable arm is weighted, when unrestrained, to swing to an upwardly extending attitude. A fixed arm extends (in the plane of the arc of movement of the movable arm) to support a guide means for a fishing line. The guide means is located below and inwardly of the end of the movable arm in the horizontal disposition of the movable arm. Thus, a fishing line may be led from its mount (preferably a reel) through the guide means, over the end of the movable arm and down through the ice. The weight of the line and the hook etc. keep the arm horizontal against its weighting. The geometry of the fixed and movable arms is designed so that, with a fish pulling on the line, the end of the movable arm is pulled by the tension of the line to swing downwardly to a point where it is above but passing inwardly of the guide means. At this point retaining means on the end of the movable arm is designed to release the line so that the fish is now directly connected to the reel or mount through the guide means. At the same time the movable arm is released to swing, under its weighting, to an upward position indicating that the fish has taken the bait.

In drawings which illustrate a preferred embodiment of the invention:

Figure 1:
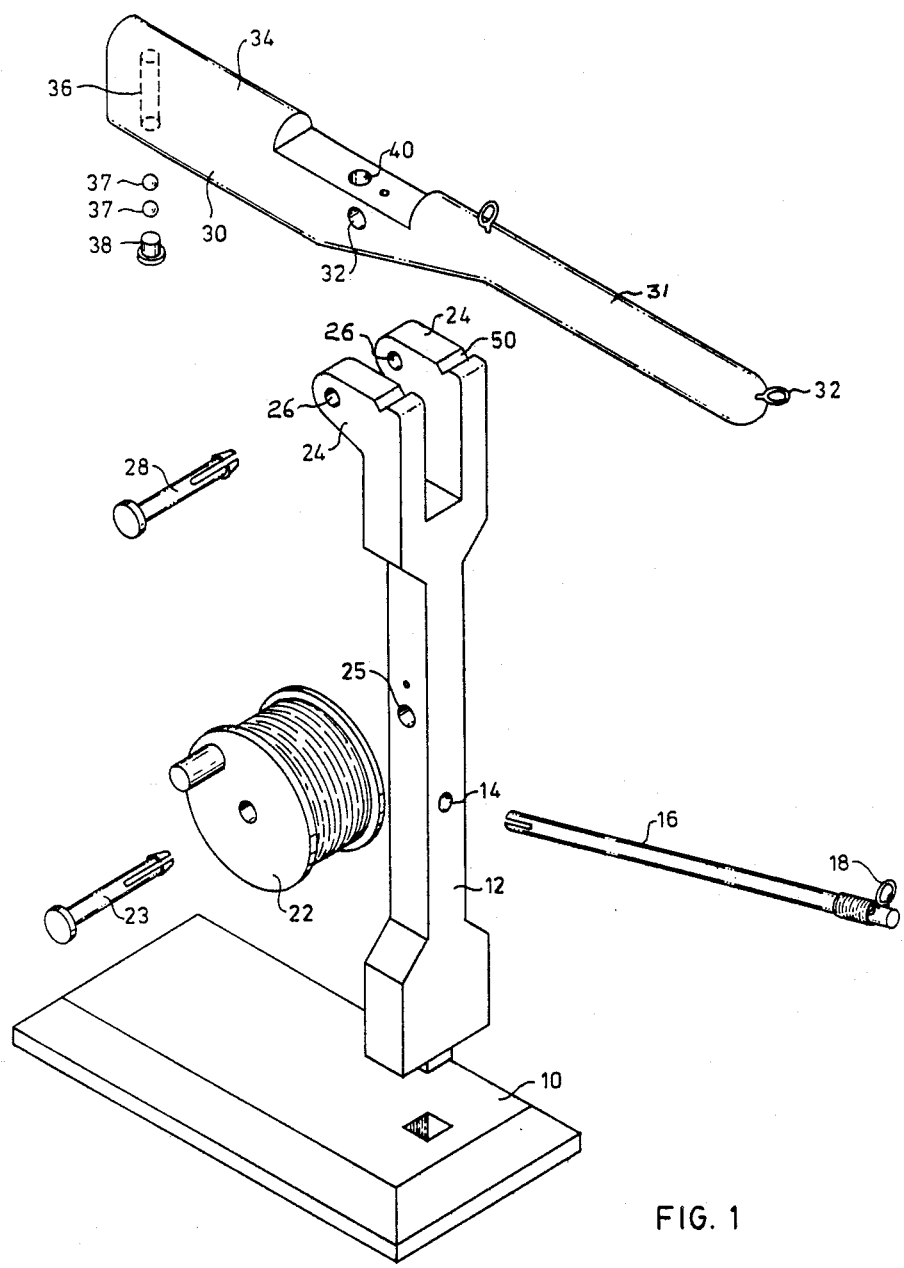
FIG. 1 is an exploded view of the development.

In FIG. 1 is shown an exploded view of the device comprising a base 10 and a standard 12 designed to connect thereto and extend upwardly therefrom. The standard is apertured at 14 to receive an outwardly extending fixed arm 16 having adjacent its outer end guide means 18 being a loop on arm 16 designed to receive and guide a fishing line 20 extending therethrough. A standard fishing reel 22 is mounted by pin 23 on the side of the standard 12 so that line 20 from the reel 22 may be led through the guide means 18.

The upper end of the standard is bifurcated to provide ears 24 defining between them a groove having its 'through' direction aligned with the direction of extension of arm 16. A pair of aligned apertures 26 through the respective ears are designed to receive pivot pin 28.

A movable arm 30 is designed to be located in the groove between ears 24 and is provided with an aperture 32 to slidably and freely receive the pin 28 so that with the pen extending through the ears and aperture 32 the arm is freely pivoted on pin 28 and relative to the standard 12. The movable arm 30 is preferably shaped to provide an enlarged extent 34 remove from arm 16 and longer extent 31 designed to extend over arm 16. Enlarged portion 34 is provided with bore 36 having a plug 38 closure for weighting the arm to assist it in maintaining an horizontal position or assuming an up-and-down position as hereinafter discussed. Thus lead weights 37, to the number desired, may be inserted in bore 36 and the plug 38 inserted to retain them.

The movable arm 30 extends toward one end having a retaining means 32 for the line 20. Reference should be made to FIGSS. 2, 3 and 4. The retaining means 32 must be designed to retain the line 20 on arm 30 in the horizontal attitude (FIG. 2) of arm 30. (Please note that in its main function the line does *not* extend through the loop in ring 32). In this position the retainer 32 is outwardly of and above the guide means 18. The line 20 (FIG. 2) runs upwardly over arm 30 at retaining means 32 and vertically downward.

The retaining means 32 is designed to release the line from arm 30 when retaining means 32 passes vertically over guide means 18 under the tension of line 20 caused by the downward pull of a fish on the line. This position is shown in FIG. 3 and is sometimes referred to herein as the 'lower position' of the arm 30 and retaining means 32. Thus the geometry of the arm 30 and retaining means 32 is designed so that retaining means 32 will cross (approximately) vertically *above* guide means 18 as shown in FIG. 3. It is fully realized that due to water currents with the device in the position of FIG. 2, and due to the direction of the tug by the fish causing the position of FIG. 3, the line will not extend quite vertically from retainer 32. However, although this may slightly alter the attitude of arm 30 at the point of release of line 20 from retainer 32 from that shown in FIG. 3, the principal of operation is the same.

The base 10 may of course be replaced by any support or supporting arrangement which will maintain standard 12 upright in use.

Figure 2:
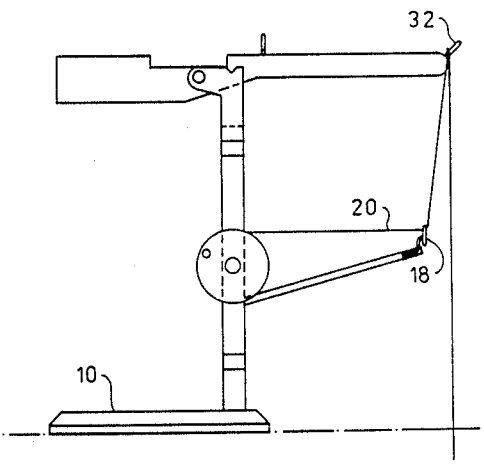
FIGS. 2, 3 and 4 are side views of the device illustrating its operation.
Figure 3:
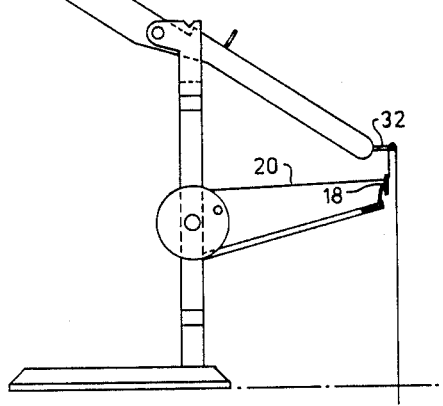

In operation, the movable 30 arm and the line 20 are arranged as shown in FIG. 2, the line will have hooks, weights and bait as determined by the fisherman.

Weights 37 will be provided on bore 36 to produce the balance of FIG. 2.

Figure 4:
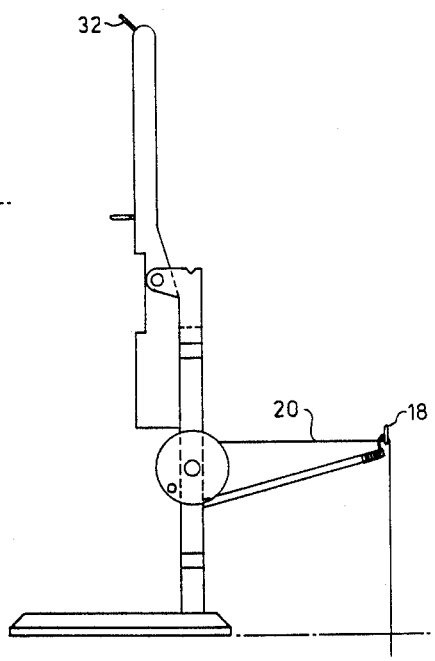

When a fish takes the bait or hook, and under the downward tension on line 20 provided by the fish, the arm is tipped downwardly until retainer 32 is vertically over guide means 18. (Or slightly removed from this position if the fishes pull is not directly vertical). At this point the guide means 32 is designed to release the line 20 so that it extnds vertically (or otherwise as determined by the travel of the fish) directly connected to guide means 18 and thereto to the reel 22. The arm then tips upwardly, under the control of its weights 37 to the position shown in FIG. 4 with the outwardly extending portion of the arm extending upwardly. This is the signal to the fisherman that a fish has taken the bait. Flags or other coloured indicators may be added to the end of arm 30 if desired to assist in its role as an indicator.

The balancing of arm 30 in the position of FIG. 2 may be achieved other than by weights 37. An adjustable weight may be provided on arm extent 34. Alternatively the arm 30 might be provided with a choice of pivot points to determine the weight biassing.

It should be noted that although retaining means 32 is shown as a loop the line 20 is *not* led through the loop. In fact the loop is not essential to the operation of the retaining means 32 as shown in FIGS. 1-4 and a retaining means may be used which is a solid adjacent to arm 30, the functional criteria for the use of the retaining means being that it retains the line 20 in the horizontal position of the arm as shown in FIG. 2 and that it release the line on a downward pull at the position of FIG. 3.

Figure 5:
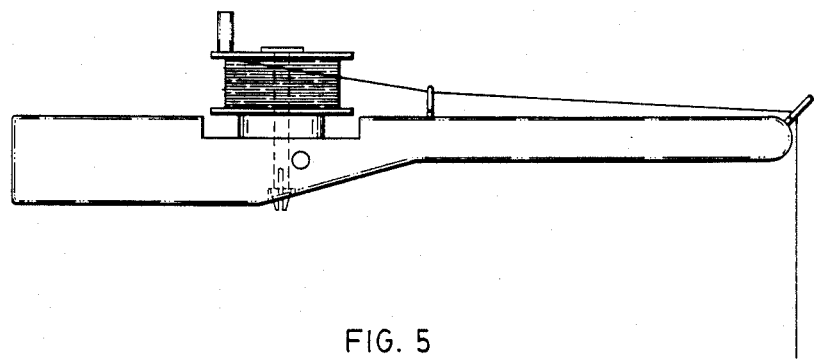
FIG. 5 illustrates the device used as a hand bell rod.

FIG. 5 shows that the arm 30 may separately be used as a fishing rod by removing it from the standard 12 and mounting it by pin 23 in the aperture 40 where the reel is side mounted. In such arrangement the line 20 is led through the loop in retaining means 32.

Figure 6:
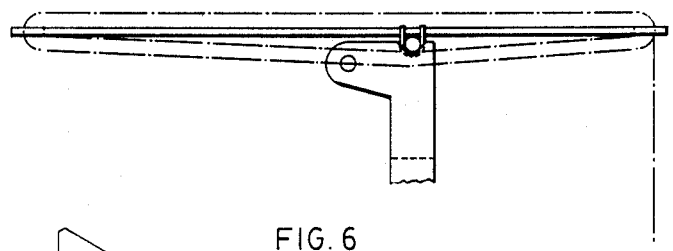
FIGS. 6 and 7 illustrate the use of part of the device as a bobber.
Figure 7:
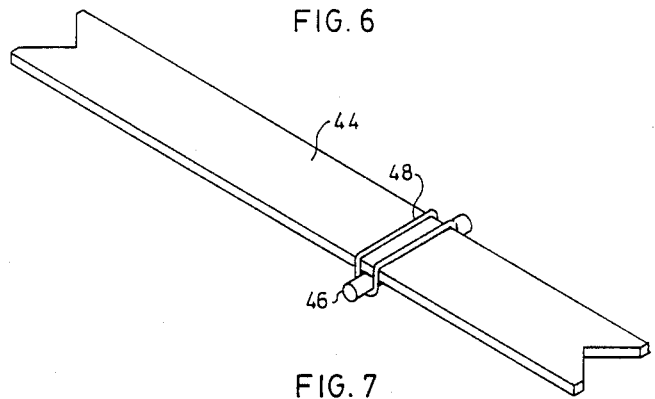

FIGS. 6 and 7 show the standard 12 and base 10 used for a bobber arrangement where, the arm 30 and reel 22 are removed and the line 20 wound on the notched stick 44 which is balanced on the notches 50 by means of pivot pin 46 held by elastic 48. When a fish is hooked by this arrangement the fisherman must pick up stick 44 and control line 20.

The embodiments of the invention in which an exclusive property or privilege is claimed are defined as follows:

1. Fishing equipment comprising:
a longitudinally extending standard, designed to extent upwardly,
means for connecting a fishing reel to said standard,
a movable arm pivotally mounted on said standard to pivot about an approximately horizontal axis above said reel,
said movable arm being designed to move in an arc of movement there one end moves from an upper position to a lower position, whereat the movable arm slopes downwardly and outwardly from said pivot point toward said one end,
retaining means adjacent said one end of said arm designed, over said arc of movement, to retain on said arm, a fishing line extending from such reel over said arm adjacent said one end and then downwardly therefrom,
said retaining means being designed to release said line from the end of said movable arm when said line is extending vertically therefrom under downward tension on the downwardly extending extent of said fishing line at the time when said arm swings downwardly past said lower position under downward tension on the line extending therefrom,
said movable arm being designed so that it may assume an approximately horizontal orientation with said line extending thereover and will assume an attitude with said one end pointing upwardly when said line is released from said movable arm,
wherein a fixed arm projects from said standard to mount a guide means for said line, said guide means being located downwardly from the location assumed by said one end of said movable arm when said movable arm is in its lower position,
and wherein sid guide means is designed and located so that said fishing line extends from said reel to contact and be guided by said guide means; then over said end of said movable arm when the line is retained by said retaining means.

2. Fishing equipment comprising:
a longitudinally extending standard, designed to extend upwardly,
means for connecting a fishing reel to said standard,
a movable arm mounted near the top of said standard to pivot about an approximately horizontal axis,
said movable arm being designed to move in an arc of movement where one end of said movable arm moves downwardly past a lower position in which the movable arm slopes downwardly and outwardly from said pivot point,
retaining means adjacent said one end of said arm designed, above said lower position to retain on said arm, a fishing line extending from said reel over said arm adjacent said one end and then downwardly therefrom, and on passing said lower position to release said fishing line from said arm,
a fixed arm, connected to said standard and defining a guide means for contacting and guiding the extent of line between said reel and said retaining means, said guide means located to be below and inwardly of said retaining means in the horizontal attitude of said movable arm, but where the location of said guide means and the arc of movement of said movable arm, are designed so that said retaining means is located higher than and above said guide means at said lower position,
wherein said arm is designed to be capable of assuming an approximately horizontal orientation with said line extending therefrom,
wherein said movable arm is so weighted relative to its pivot point that when said line is released, said arm swings so that said one end is pointing upwardly.

3. Fishing equipment comprising:
a longitudinally extending standard designed to extend upwardly,
means for connecting a fishing line to said standard,
a stationary arm extending outwardly from said standard having guide means adjacent the outer end,
a movable arm mounted on said standard above said stationary arm to pivot about an approximately horizontal axis,
said movable arm being designed to move in an arc, in approximately the same vertical plane defined by said stationary arm, from an upper position, to a lower position wherein the movable arm adjacent said one end slopes downwardly and outwardly from said pivot point, retaining means adjacent said one end of said arm, designed over said arc of movement, to retain on said arm a fishing line extending from said guide means over said arm adjacent said one end and downwardly therefrom, said retaining means being designed to so retain said line in said arc of movement between the horizontal attitude of said arm and said lower position, said retaining means being designed so that in said lower position, said end of said movable arm is approximately vertically above said guide means, said retaining means being designed to release said line from the end of said movable arm when said movable arm swings downwardly past said lower position under downward tension of the line extending therefrom, said movable arm being designed so that it may assume an approximately horizontal orientation with said line extending thereover, wherein said movable arm is so weighted relative to its pivot point that when said line is released, said arm swings so that said one end is pointing upwardly.

* * * * *